May 14, 1968  B. A. REED  3,383,154
SELF-ALIGNING REAR VISION MIRRORS
Filed May 4, 1964  3 Sheets-Sheet 1

INVENTOR
Bert A. Reed

BY

ATTORNEYS

May 14, 1968

B. A. REED 3,383,154

SELF-ALIGNING REAR VISION MIRRORS

Filed May 4, 1964

INVENTOR

Bert A. Reed

BY *Moore, Hall & Pollock*

ATTORNEYS

May 14, 1968

B. A. REED 3,383,154

SELF-ALIGNING REAR VISION MIRRORS

Filed May 4, 1964

INVENTOR
Bert A. Reed

BY Moore, Hall & Pourck

ATTORNEYS

United States Patent Office 3,383,154
Patented May 14, 1968

3,383,154
SELF-ALIGNING REAR VISION MIRRORS
Bert A. Reed, 400 Crosby Ave., Deal, N.J. 07723
Filed May 4, 1964, Ser. No. 364,614
14 Claims. (Cl. 350—293)

ABSTRACT OF THE DISCLOSURE

A vehicular rear vision mirror is mounted for pivotal movement about a generally horizontal axis, and gravity oriented weight means mounted on the vehicle for movement with changes in angular orientation of said vehicle relative to horizontal are coupled to the rear vision mirror for effecting pivotal movement of the mirror about the axis through an angle and in a sense related to the direction and magnitude of the change in angular orientation of the vehicle.

---

The present invention relates to rear vision mirrors adapted for use on various types of vehicles, and is more particularly concerned with the provision of a vehicular rear vision system comprising a mechanical arrangement adapted to automatically re-align a mirror relative to the vehicle longitudinal axis, as a vehicle travels over various types of terrain thereby to assure that proper rear view and side view observations may be maintained due to adjustments in the mirror position, as distinguished from changes in the position of an observer such as has been necessary heretofore.

A variety of rear view mirror arrangements have been suggested heretofore for use on various types of vehicles. Such prior arrangements are generally adapted for mounting on the dash-board of a vehicle, or depending from the windshield or interior roof of the vehicle above the dash-board; or, in the alternative, may be mounted on the fender of a vehicle, or externally of the cab of certain types of vehicles, such as trucks or buses. Such arrangements, suggested heretofore, have been uniformly characterized by a mirror which is initially adjusted to a position affording proper rear vision at the time of said adjustment; with the said mirror then being held against pivotal or other movement and effectively locked in its fixed position of adjustment during subsequent operation of the vehicle. The intital adjustment thus effected to such prior art fixed-position mirrors is dependent, of course, upon the stature of the driver, or other observer in the vehicle, and upon the position of the vehicle, relative to horizontal, at the time of adjustment.

While the adjustments thus effected in prior rear-vision mirror assemblies provide proper rear vision under the circumstances prevailing at the time of the initial adjustment, subsequent operation of the vehicle over various up-hill and down-hill terrains results in the original field of observation being restricted or, in some cases, actually obscured, due to the change in position of the vehicle itself, i.e., due to the fact that the front wheels of the vehicle will be relocated upwardly or downwardly relative to the rear wheels of the vehicle. Such restrictions in the field of observation are, in many cases, aggravated by the fact that changes in vehicle position, e.g., relatively upwards or downwards, result in related changes in position of the driver of the vehicle. For example, if the initial adjustment were effected at a time that the vehicle was in a level position, subsequent operation of the vehicle over a down-hill slope tends to raise the effective angle of the rear-view mirror, and also tends to shift the body of the driver forwardly; and both effects operate to move the field of observation afforded by the fixed position rear vision mirror upwardly relative to the rearward area which should actually be under observation. Similarly, if the vehicle should operate over an up-hill slope, the rear view mirror tends to angle relatively downward, and the position of the observer tends to be shifted in a rearward direction; and both effects again operate to move the field of observation afforded by the aforementioned fixed position mirror in a downward direction relative to the area which should be under observation. Moreover, if a vehicle (e.g., having a length of about twenty feet), should traverse an incline of 2000 to 5000 feet, e.g. ascending from, or descending into, a valley, the vehicle may encounter numerous minor dips and rises during said traverse which also relocate the front and rear wheels of the car relative to one another, and which relocate the relative angle of the rear view mirror in a direction opposite to that resulting from the general direction of the incline and in opposition to the changed position of the driver resulting from said general incline; and these transient conditions further aggravate the restrictions in the rearward field of observation.

The shifts in the observation field, thus effected due to relocations in the effective angle of the mirror and due to shifting positions of the operator, alter the actual field of observation in an undesirable manner relative to the terrain rearward of the vehicle; and, in many cases, the shifted field of observation is additionally restricted due to the fact that the new field of observation may be partially or totally obscured by portions of the vehicle itself, e.g., adjacent the upper or lower extremities of the vehicle rear window. These same undesirable conditions occur not only when the vehicle is in operation over varying terrains, but also when the vehicle is in a stationary position on an inclined terrain, e.g., at a stop light or in a parking location; and, in all these circumstances, the field of rearward observation may be totally or partially obscured due to the fact that the physical orientation of the vehicle has changed from that which prevailed at the time the fixed position rear vision mirror was originally adjusted.

As a practical matter, persons operating vehicles having rear vision mirrors of the fixed types conventional heretofore, have unconsciously recognized these limitations of existing rear vision systems, and have sought to compensate therefore by the vehicle operator actually repositioning his body relative to the fixed position rear vision mirror. For example, if the operator tends to be shifted rearwardly due to movement of the vehicle over an uphill terrain, the operator, to give himself a proper field of vision, unconsciously strains his body forwardly and/or stretches his head or neck into a position which gives an adequate field of observation. Similar changes in operator position are unconsciously effected during operation of the vehicle over a down-hill terrain; as well as when the vehicle is stationary in some inclined position. These changes in operator position, unconsciously effected in order to give the vehicle operator an adequate field of rearward observation under circumstances then prevailing, contribute in large measure to fatigue of the operator, particularly when the vehicle is operated for any significant period of time over terrain exhibiting relatively frequent variations in inclination, dips, rises, etc. The resulting fatigue has, in general, merely been tolerated, and considered a necessary incident of driving, especially over long distances; and the type of body repositioning described has, in fact, become so commonplace in the operation of vehicles equipped with fixed position rear vision mirrors, that the reason for the resulting fatigue had not even been recognized.

*Summary of the invention*

The present invention, recognizing the foregoing factors, is intended to obviate the limitations in fields of rearward observation and/or the required repositioning of the operator's body, so as to provide an adequate and best field of vision as the vehicle travels over various types of terrain (up-hill, down-hill, curves), without requiring that the operator reposition his body to achieve said best field of vision. More particularly, the present invention provides a novel rear vision mirror arrangement so constructed that the rear vision mirror automatically repositions itself under the influence of gravity, so as to provide the driver of a vehicle with a proper field of vision appropriately related to the normal position which the operator's body tends to assume as the inclination of the vehicle varies. As a result, the operator may remain relaxed during all variations in vehicle position, and may permit his body to assume the position dictated by the particular prevailing inclination of his vehicle; and a proper field of rearward observation will nevertheless be provided due to the reorientation of the rear vision mirror itself.

In providing for the foregoing objects and advantages, the present invention contemplates the provision of a vehicular mirror, preferably of the curved (convex) type, although it may be of the planar type conventional at the present time, associated with a mounting arrangement comprising a linkage assembly associated with a weight and with damping means, adapted to effect mechanical repositioning or reorientation of a mirror with changes in vehicle orientation, while simultaneously minimizing the effects of jitter, vibration, or shock upon the mirror position. As will appear, the mechanical arrangement is such that a weight, comprising a portion of the novel assembly, continuously seeks a new position under the influence of gravity as the vehicle travels over various terrains. The mechanical arrangement, including the aforementioned weight, is coupled to a pivotably mounted mirror by means of a ratio-producing assembly operative to pivot the said mirror in a direction and amount adequate to compensate for a change in angular orientation experienced by the vehicle upon which the assembly is mounted.

The use of a curved mirror tends to avoid certain restrictions in rearward field of observation, particularly when minor dips or rises of less than 10° are encountered; and also tends to smooth out variations in the rearward field of observation when the mirror is shifted to a new position, especially when the shift is effected in a step-wise manner, as will be described. The said arrangement is, moreover, associated with appropriate damping means, e.g., taking the form of retention spring elements or other known damping mechanisms such as a dash-pot, tending to resist pivotal movement of the mirror until the amount of angular change in vehicle orientation, upon which the mirror assembly is mounted, is sufficient to require repositioning of the mirror to maintain proper rearward observation. The system accordingly permits a vehicle operator to be relaxed throughout the period of vehicle operation, despite changes in orientation of the vehicle during such operation; and a proper and best field of vision is nevertheless afforded at all times.

The foregoing objects, advantages, construction and operation of the present invention will become more readily apparent from the following description and accompanying drawings, in which:

FIGURES 1A, 1B, and 1C diagrammatically illustrate the shifts in field of observation which result from operation of a vehicle over varying terrains with a fixed position rear view mirror of the type conventional at the present time;

Figure 1A:
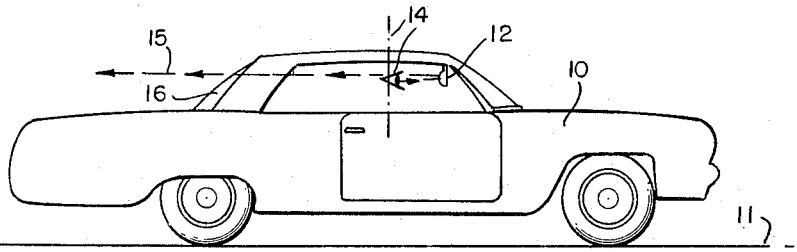
Figure 1B:
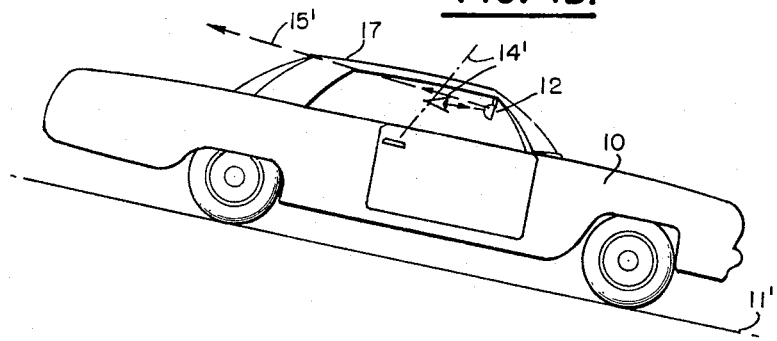
Figure 1C:
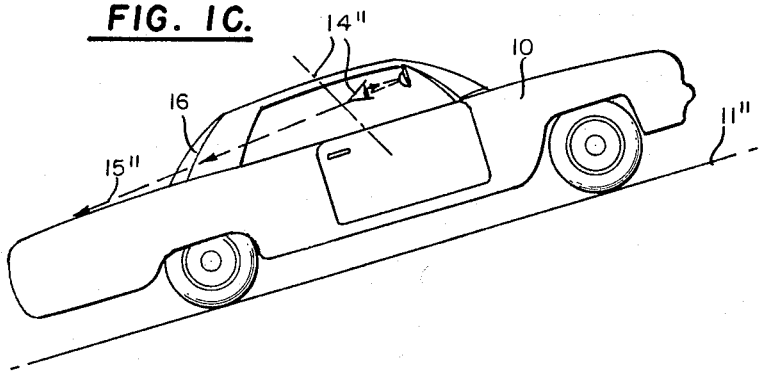

Referring initially to FIGURES 1A, 1B, and 1C, it will be seen that variations in orientation of a vehicle, using a fixed position rear vision mirror, result in the various observation limitations described previously. FIGURE 1A depicts a vehicle 10 operating over substantially level terrain 11, and having a fixed position rear vision mirror 12 thereon. It is assumed for purposes of discussion that the mirror 12 had been appropriately adjusted by an operator (diagrammatically depicted at 14) so as to afford a proper rearward field of vision, depicted at 15, through the rear window 16 of the vehicle 10. If the vehicle 10 should now be caused to operate over terrain 11' characterized by a down-hill slope as shown in FIGURE 1B, the position of the operator tends to be shifted forwardly to a new position 14'; and this, in conjunction with the previously described shift in relative mirror angle, tends (absent repositioning of the operator's body) to shift the field of observation upwardly to a new position 15'. As will be appreciated from the illustration of FIG. 1B, this shifted field of observation does not afford proper observation of vehicles to the rear of the vehicle 10; and, indeed, the new field of observation 15' may actually be partially or totally obscured by the top 17 of the vehicle 10. To obviate these undesirable conditions, it is conventional for the operator to strain his body rearwardly, or to otherwise relocate his head and shoulders so as to compensate for the undesirable results mentioned.

Analogous problems arise when the vehicle 10 operates over upwardly inclined terrain, such as is designated 11'' in FIGURE 1C. In such instance, the relative angle of the mirror again tends to shift downwardly, as described, and the operator of the vehicle also tends to be shifted in a rearward direction by the forces of gravity as shown at 14''. The operator's field of observation is thus diverted downwardly as indicated at 15''. In this latter instance, as depicted in FIGURE 1C, the operator's field of vision may again be partially or totally obscured by the rear seat of the vehicle 10, or by portions of the vehicle to the rear of window 16; and the operator must accordingly again reposition his body, or head and shoulders, to compensate for the downward shift in the observation field.

The observation problems depicted in FIGURES 1A through 1C may be further aggravated by other prevailing conditions, e.g., dips and rises which make repositioning of the operator's body all the more difficult. Moreover, the degree to which the field of observation is obscured depends in some measure upon the size of the rear window 16 of the vehicle; and if this window is relatively small, severe limitations in the observation field result even with relatively limited changes in vehicle orientation. Moreover, if the fixed position mirror 12 is of planar type, limitations in the field of vision will occur when the vehicle is rounding a sweeping curve. Continued re-adjustment of the mirror also becomes a problem when different drivers of different statures are using the same vehicle; and this becomes an especially pronounced problem when a passenger or the vehicle operator tilts the rear view mirror to observe one's-self. The mechanical arrangements of the present invention eliminate the observation problems thus encountered under all of these varying circumstances.

Figure 2:
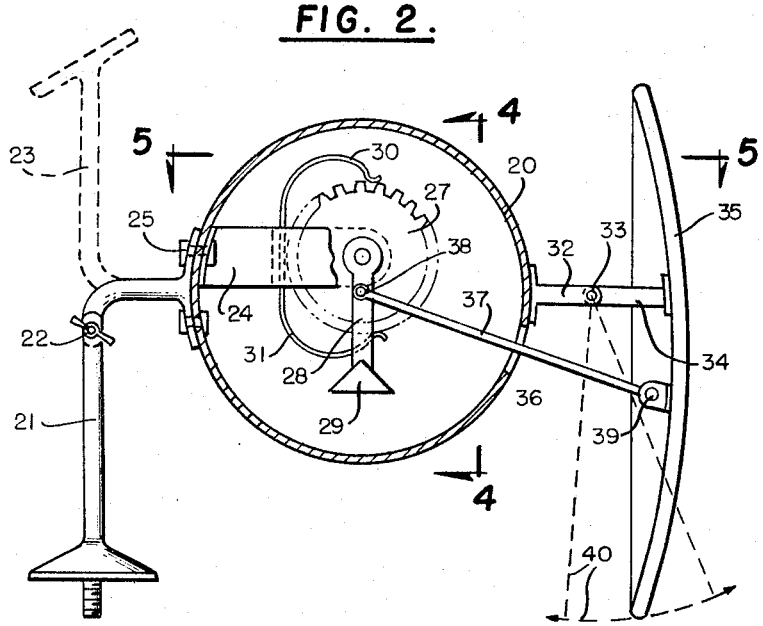
FIGURE 2 is a side view, in partial section, of an improved mirror arrangement constructed in accordance with one embodiment of the present invention.
Figure 3:
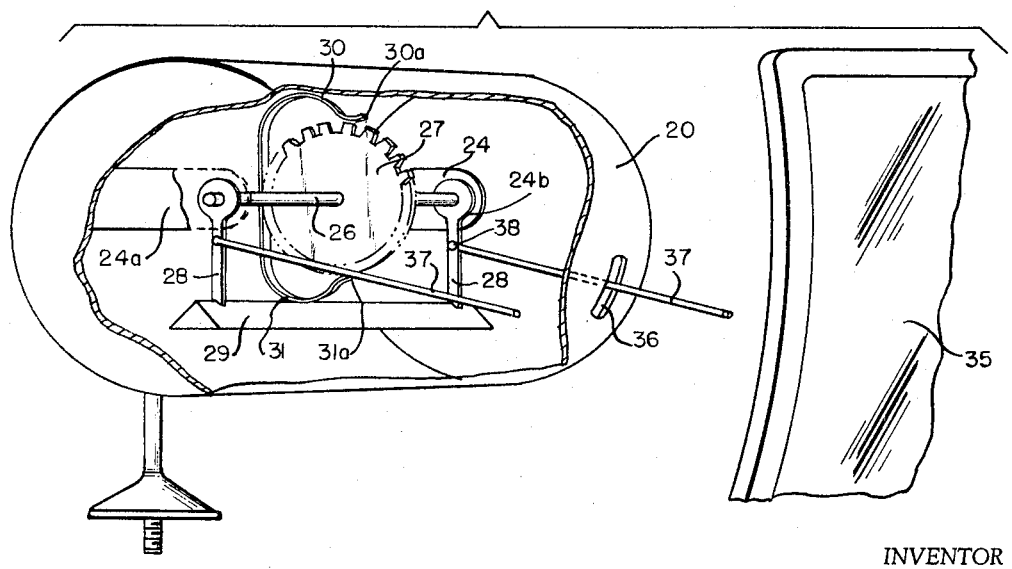
FIGURE 3 is a perspective view, partially cut away, of the arrangement shown in FIGURE 2.
Figure 4:
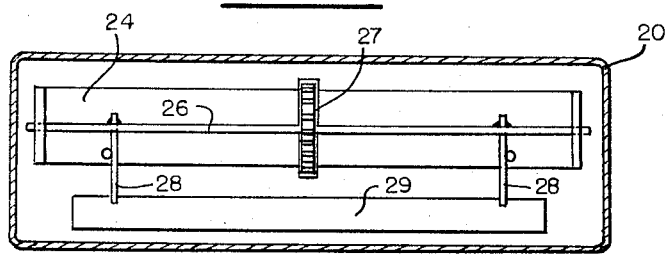
FIGURE 4 is a front view of a portion of the mirror repositioning apparatus, taken on line 4—4 of FIGURE 2.

A first embodiment of the present invention is illustrated in FIGURES 2 through 5 inclusive; and like numerals will be used to identify like parts throughout the several figures. The assembly is characterized by the provision of a housing 20, the rearward portion of which is mounted upon a bracket 21 having an adjustable portion 22. The particular bracket 21 shown in FIGURES 2 and 3 is intended for mounting the overall assembly on the dash-board of a vehicle; but an alternative bracket such as is indicated at 23 (FIGURE 2) may be provided in the event that it is desired to mount the assembly from an overhead support. Adjustment member 22 is provided to permit the overall assembly, including housing 20, the various parts enclosed therein (to be described), and the associated mirror member, to be initially positioned, as a unit, thereby to provide a proper field of rearward vision dependent upon the stature of the particular operator of the vehicle, the size of the rear window, the prevailing orientation of the vehicle, et cetera. The adjustment member 22 may be replaced, if desired, by other structures capable of achieving similar results, e.g., the brackets 21 or 23 may be of flexible "goose-neck" construction.

A generally U-shaped bracket 24 having a pair of outstanding flanges 24a–24b is fixedly mounted within housing 20 by means of bolt members 25 disposed adjacent the rear of the housing. A shaft 26 extends between the outstanding arm 24a–24b of bracket 24, being journalled therein for relatively free rotation; and said shaft 26 has a gear wheel 27 mounted thereon for rotation therewith and operating as a damping and incremental locking mechanism. As will appear, the gear wheel 27 preferably has thirty-six teeth spaced ten degrees from one another, whereby the gear wheel 27 may be caused to rotate in ten degree increments; and, as will also appear, the wheel 27, and its associated parts, otherwise hold the overall adjustment mechanism locked in a particular angular orientation until a further change in mirror position becomes necessary.

A pair of downwardly extending arms 28 are attached adjacent their upper ends to the aforementioned shaft 26; and the lower ends of said downwardly extending arms 28 support a weight member 29. It will be appreciated, as the description proceeds, that the member 28–29, which is somewhat analogous to a pendulum, may employ only a single supporting arm 28, or more than two such arms, depending upon the particular mechanical arrangement selected; and it will, moreover, be appreciated that the shaft 26 may be dispensed with, and other pivotal supports provided for pendulous member 28–29, when damping arrangements other than those used in FIGURES 2–5 (e.g., as in FIGURE 8) are selected. In any event, the arrangement is such that, as housing 20 changes in position, due to changes in orientation of the vehicle, the weight 29 tends to seek a downward-most position under the influence of gravity; and in the system of FIGURES 2–5, this action of member 28–29 rotates shaft 26 and gear wheel 27 in a related manner.

Free rotation of the gear wheel 27 and shaft 26 is restrained by appropriate damping means; and in the arrangement of FIGURES 2 through 5, these damping means comprise a pair of retention springs 30–31, attached to bracket 24 and having a pair of curved ends 30a–31a bearing upon the teeth, and interspaces therebetween, of gear wheel 27. As a result of this arrangement, the gear wheel 27 and its shaft 26 are permitted to rotate only when a sufficient change in vehicle orientation has been effected to overcome the retention force of the springs 30–31. Similarly, it will be appreciated that incidental shock, vibration, or jitter imposed upon the vehicle during rough road operation or the like, will not be manifested in similar jitter or movement of the mirror, due to the damping and retention forces of the springs 30–31.

The forward wall of housing 20 is provided with an outstanding bracket 32 to which is pivotally attached (at pivot 33) a corresponding rearwardly extending bracket 34 attached to mirror 35. The mirror does not weigh on the overall adjusting mechanism, but is supported entirely by pivot 33–34 so that, as will appear, the adjusting mechanism need only reposition the mirror but need not actually support it. Mirror 35, as mentioned previously, may be of the planar type presently in wide use; but, in the preferred embodiment of the present invention, said mirror 35 is given a curvature in both horizontal and vertical directions of approximately eight degrees, thereby to achieve a best field of observation, rearward vision, during relocations of the mirror 35. Such a curved mirror permits drivers of varying different statures to use the apparatus without readjusting the mirror's initial position; tends to smooth out variations in rearward field of observation; tends to increase side vision especially when the vehicle is parked or is operating on a curve; and tends to minimize observation disturbances during operation over minor dips and rises, and during relocations of the mirror from one to another position.

Housing 20 is further provided with a pair of elongated slots 36 through which pass a pair of elongated links 37. The rearward ends of the links 37 are pivotally attached to the aforementioned downwardly extending arms 28, as at 38; and the forwardmost ends of the said links 37 are pivotally attached to the mirror 35 at a pair of spaced points 39 located (in this particular embodiment of the invention) below the pivot 33 of the mirror itself. This interconnection afforded by links 37 is such that when arms 28 shift in position relative to bracket 24 due to reorientation of the weight 29, the movement of arms 28 is translated into a related movement of mirror 35 about its pivot 33, with the movement of all said parts being damped by the force of spring members 30–31 on gear wheel 27. This possible pivotal action of mirror 35, in the circumstances described, is diagrammatically illustrated in FIGURE 2 by the dotted lines 40. Moreover, as will become apparent, the lengths of the various links, and their points of interconnection, give rise to a ratio-type movement, so that the amount of angular movement of the mirror is a predetermined fraction of the change in angular orientation of the vehicle. Similar results may, of course, be achieved by the use of appropriate step-down gearing arrangements in the linkage, as will be apparent to those skilled in the art.

As the vehicle travels over rough or uneven terrain, weight member 29 will reposition itself according to its center of gravity; and the wheel 27, mounted on shaft 26, will turn in a controlled or damped fashion, governed by retention springs 30–31, with a minimum of response to vibration, shock and jittter. The mechanical linkage used in FIGURES 2–5 is such that a ratio of substantially two to one is provided in the angular changes of arm 28 and mirror 35, i.e., during reorientations, the weight 29 will move through an arc substantially twice that of mirror 35, so that a ten degree movement in weight 29 will manifest itself as a five degree reorientation in the mirror 35, et cetera. Other ratios could, of course, be provided, particularly when the mirror 35 is of the planar type, although the 2:1 ratio described achieves good results when the mirror 35 has a curved configuration of the type mentioned previously.

When gear wheel 27 is provided with thirty-six teeth, spaced ten degrees apart, the mechanical arrangement is preferably such as to permit the gear wheel 27 to move nine teeth (or +90°) in a clockwise direction; and also to permit said gear wheel 27 to move nine teeth (or −90°) in a counter-clockwise direction. This range of possible movement is more than adequate to compensate for changes in inclination which will be encountered in normal operation of a vehicle, since most hills are limited to a fifty or fifty-five degree incline or decline. The member 29 may have a weight of approximately eight ounces when the system is to be employed as a dash-board or overhead mounted assembly; and in this particular form of the invention, the retention springs 30–31 may be adjusted to provide substantially a two ounce pull. These parameters will, of course, vary with variations in the size, weight, and mounting of the mirror 35. By way of example, if an arrangement of the general type described is to be used in conjunction with a fender-mounted rear vision mirror, the weight 29 should have a weight of substantially ten ounces; and the springs 30–31 should be adjusted to provide a three ounce pull. Truck type mirrors, which are normally substantially larger in size and greater in weight may require use of a member 29 having a weight of substantially sixteen to eighteen ounces, and spring retention members 30–31 adjusted to provide a substantially five ounce pull. In any event, since the weight of mirror 35 is retained on the fixed support 32–34, the movement of weight 29 is only required to effect a change in position of the mirror 35. This, of course, permits the adjustment mechanism to operate with a minimum of effort, and with a maximum of efficiency.

If we assume that the vehicle is on level ground at the start, and then goes over a five degree incline or decline, the retention springs, in the arrangement of FIGURES 2–5, should be adjusted to provide sufficient force to lock wheel 27 against rotation, thereby to resist any change in position of mirror 35. This situation also prevails during operation of the vehicle over seven or eight degree inclinations a well; and the use of a curved mirror, of the type described previously, assures a proper field of vision even though the mirror is not actually repositioned. If the vehicle should then encounter a ten degree incline or decline, the weight 29 overcomes the retention force of springs 30–31, and operates to move the arms 28, and the gear wheel 27, in a step-wise motion through an arc of substantially ten degrees, corresponding to the angular spacing between two teeth. This will, in turn, effect a five degree adjustment of the mirror 35. If the vehicle should traverse an eighteen degree-twenty degree incline or decline, the parts within housing 20 will step through a total arc of substantially twenty degrees, thereby to effect a susbtantially ten degree change in the orientation of mirror 35. The operation of the overall system over other inclines can be understood by analogy.

It will also be appreciated that the arrangement further operates to restore the mirror 35 to a particular angular position properly related to the particular orientation of the vehicle then existing, if the mirror should be physically moved through a much larger arc (e.g., by the vehicle operator or a passenger) than is consistent with the vehicle orientation at that time. By using a slightly convex mirror, proper side-view vision is afforded and maintained throughout the described changes in mirror position; and this is of particular value when the vehicle is rounding a curve, or traversing a curved incline or decline. Moreover, the use of a curved mirror tends to smooth out the described step-type changes effected by mirror 35 due to the increased field of vision afforded by such a curved mirror under all conditions.

Figure 6:
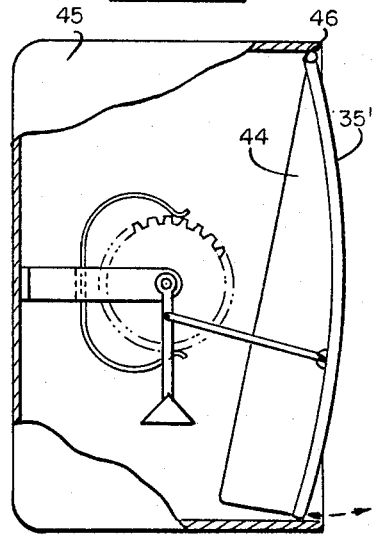
FIGURE 6 is a side view, in partial section, of a modified form of structure constructed in accordance with the present invention.
Figure 5:
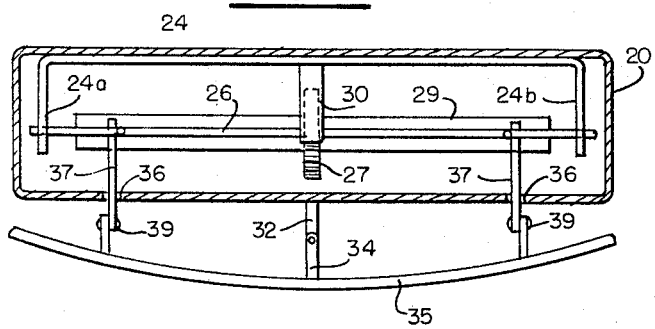
FIGURE 5 is a top view of a portion of the mirror repositioning apparatus, taken on line 5—5 of FIGURE 2.

An alternative arrangement operating in accordance with the present invention is shown in FIG. 6. As is there depicted, the mirror 35' may be mounted within a weather-guard 45 such as is used at the present time in exterior mounted mirrors; and when such a weather-guard is provided, it may also be used to mount the various brackets, arms, weight, springs, and gear wheel described in reference to FIGURES 2 through 5, thereby eliminating the need of a separate housing such as 20. The mirror 35' preferably has side wings 44, cooperating with the sides of housing 45 to provide full weather protection for the interior adjusting mechanism. Moreover, as illustrated in FIGURE 6, the mirror 35' may be mounted for movement about a pivot point located adjacent one of its vertical extremities; and this pivot point may, for example, be located adjacent the uppermost edge of the mirror as depicted at 46, rather than at an intermediate point on the mirror such as was employed in the arrangement of FIGURES 2 through 5.

Figure 7:
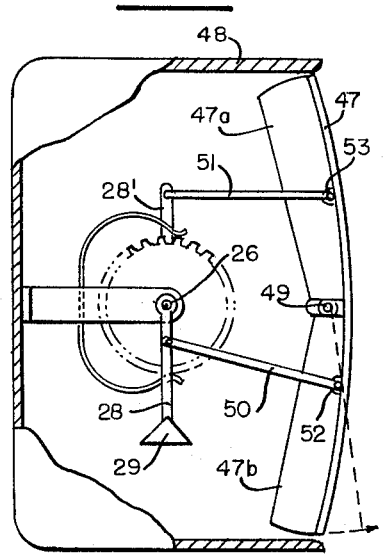
FIGURE 7 is a side view, in partial section, of another modification of the present invention.

Still another arrangement is shown in FIGURE 7, wherein the mirror 47 is again mounted within a weather-guard 48 acting, additionally, as a housing for the various mechanical parts controlling movement of mirror 47. The mirror 47 is preferably provided with pairs of side wings 47a and 47b, again cooperating with the side of housing 48 to provide full weather protection to the internal adjusting mechanism. In the arrangement of FIGURE 7, the mirror 47 is mounted for pivotal movement about a centrally located point 49. In addition, the arms 28 of FIGURES 2 through 5 are extended above the location of shaft 26 to provide upper portions 28'; and a pair of links 50–51 may then extend from points on both the arm portions 28–28', located both below and above shaft 26, to further points of pivotal attachment 52 and 53 disposed on mirror 47 at locations both below and above the central mirror pivot 49. Shifts of position of the weight 29, and resulting movement of arm portions 28–28', thus effect both a pushing and a pulling action on mirror 47 at locations positioned on opposite sides of the mirror pivot 49, thereby achieving a mechanical advantage over the single link form of the invention described in reference to FIGURES 2 through 5.

Figure 8:
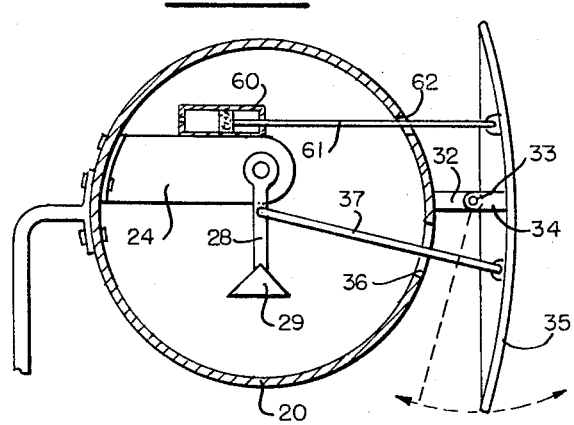
FIGURE 8 is a side view of a still further modification of the present invention.

A still further embodiment of the present invention is illustrated in FIGURE 8; and since this embodiment corresponds in many respects to that described in reference to FIGURE 2, like numerals have been given to like such parts. In the arrangement of FIGURE 8, however, the retention springs 30–31 are eliminated; and a desired damping effect is produced by means of an air cylinder type dash-pot 60 coupled to mirror 35 by means of a further link 61 passing through a further orifice 62 in housing 20. Such a dash-pot smooths out possible irregularities in movement of mirror 35, as is well known to those skilled in the art. The alternative form of damping mechanism thus provided permits elimination of shaft 26, wheel 27, and springs 30–31; and member 28–29 may be mounted on bracket 24 by a different type of pivot, e.g., a rivet.

While I have thus described preferred embodiments of the present invention, many variations will be suggested to those skilled in the art and certain of these variations have, in fact, been described. It should accordingly be understood that the foregoing description is meant to be illustrative only and not limitative of my invention, and all such variations and modifications as are in accord with the principles of the invention are meant to fall within the scope of the appended claims.

Having thus described my invention, I claim:

1. A vehicular rear vision system comprising a rear vision mirror, means for mounting said mirror on a vehicle for pivotal movement about a generally horizontal axis, gravity oriented weight means mounted on said vehicle for movement with changes in angular orientation of said vehicle relative to horizontal, connecting means coupling said weight means to said rear vision mirror for effecting pivotal movement of said mirror about said axis through an angle and in a sense related to the direction and magnitude of said change in angular orientation of said vehicle, and damping means coupled to said mirror for resisting changes in the pivotal position or said mirror about said axis.

2. The system of claim 1 wherein said connecting means comprises ratio producing means operative to cause said mirror to pivot through an angle comprising a fraction of the change in angular orientation of said vehicle.

3. A vehicular rear vision system comprising a vehicle, a mirror mounted on said vehicle in a generally vertically oriented plane for pivotal motion about a generally horizontally oriented axis, means for monitoring the angular orientation of said vehicle relative to horizontal, and means coupled to said monitoring means and responsive to a change in said vehicle angular orientation for pivoting said mirror about said axis through an angle related to said change in vehicle orientation, said last-named means comprising means operative to effect pivoting of said mirror in a plurality of steps of predetermined angular increments, and means for locking said mirror to prevent stepping thereof from one to the next of said angular increments until the change in said vehicle angular orientation exceeds a predetermined magnitude.

4. The system of claim 3 wherein said generally vertically oriented mirror comprises a reflective surface curved both horizontally and vertically.

5. A vehicular rear vision system comprising a housing adapted to be mounted upon a vehicle, gravity oriented weight means located within said housing for pivotal movement about a preselected point in response to changes in orientation of said housing relative to horizontal, a generally vertically oriented mirror pivotably attached to said housing for pivotal movement about a generally horizontal axis located adjacent one of the vertical extremities of said mirror, and linkage means coupled to said mirror at a location spaced from the point of pivotal attachment of said mirror to said housing for pivoting said mirror about said horizontal axis in response to pivotal movement of said gravity oriented weight means relative to said housing.

6. The system of claim 5 wherein said housing comprises a weather-guard, said mirror being located at least partially within said weather-guard.

7. A vehicular rear vision system comprising a vehicle having a generally horizontally extending rotatable shaft mounted thereon, first linkage means attached to said shaft and extending downwardly therefrom, weight means attached to the lower end of said first linkage means for orientation under the influence of gravity, whereby a change in the angular inclination of said vehicle effects a related rotation of said shaft through said first linkage means, a mirror mounted for pivotal movement about a relatively fixed axis, and second linkage means pivotally attached at one end to said first linkage means and pivotally attached at its other end to said mirror at a location spaced from said relatively fixed axis for effecting pivotal movement of said mirror about said axis upon rotation of said shaft.

8. The system of claim 7 including a wheel member fixedly attached to said shaft for rotation therewith, and resilient means engaging the periphery of said wheel member for resisting rotation of said shaft and pivoting of said mirror.

9. The system of claim 8 wherein the periphery of said wheel member defined a plurality of spaced teeth, said resilient means comprising leaf-spring means having a free end engaging the toothed periphery of said wheel member.

10. The system of claim 7 including dash-pot means, and third linkage means coupling said dash-pot means to said mirror for damping pivotal movement of said mirror.

11. In a vehicular rear vision system, means comprising a gravity-oriented weight attached to at least one generally vertically extending link, said link being mounted for pivotal movement about a first generally horizontally extending axis spaced from and located above said weight, a rear-vision mirror mounted for pivotal movement about a second generally horizontally extending axis, and at least one further link extending from said first mentioned link to a point on said mirror vertically spaced from said second axis for pivoting said mirror about said second axis when said first mentioned link pivots about said first axis under the influence of said gravity-oriented weight.

12. The system of claim 11 wherein said first mentioned link includes first and second portions extending both above and below said first axis respectively, said further link comprising a pair of arms extending from said first and second portions to points on said mirror located both above and below said second axis respectively.

13. A vehicular rear vision system comprising a housing adapted to be mounted upon a vehicle, gravity oriented weight means located within said housing for pivotal movement about a preselected point in response to changes in orientation of said housing relative to horizontal, damping means comprising spring means coupled to said weight means for resisting free movement of said weight means about said preselected point, a generally vertically oriented mirror pivotally attached to said housing for pivotal movement about a generally hoizontal axis, and linkage means coupled to said mirror at a location spaced from the point of pivotal attachment of said mirror to said housing for pivoting said mirror about said horizontal axis in response to pivotal movement of said gravity oriented weight means relative to said housing.

14. A vehicular rear vision system comprising a housing adapted to be mounted upon a vehicle, gravity oriented weight means located within said housing for pivotal movement about a preselected point in response to changes in orientation of said housing relative to horizontal, a generally vertically oriented mirror pivotally attached to said housing for pivotal movement about a generally horizontal axis, damping means comprising a dash-pot coupled to said mirror for resisting free pivoting of said mirror about said axis, and linkage means coupled to said mirror at a location spaced from the point of pivotal attachment of said mirror to said housing for pivoting said mirror about said horizontal axis in response to pivotal movement of said gravity oriented weight means relative to said housing.

References Cited

UNITED STATES PATENTS 1,524,788   2/1925   Gardner _____ 88—1

FOREIGN PATENTS 546,552   9/1939   Great Britain.

ROY D. FRAZIER, *Primary Examiner.*

C. E. HARRIS, *Examiner.*

FRANK DOMOTOR, *Assistant Examiner.*